UNITED STATES PATENT OFFICE.

RUSSELL WILLIAM MUMFORD, OF NEW YORK, N. Y., ASSIGNOR TO REFINING PRODUCTS CORPORATION, OF WILMINGTON, DELAWARE, A CORPORATION OF DELAWARE.

DECOLORIZING AND PURIFYING AGENT AND METHOD OF MAKING THE SAME.

1,286,187.  Specification of Letters Patent.  Patented Nov. 26, 1918.

No Drawing.  Application filed May 11, 1917.  Serial No. 167,971.

*To all whom it may concern:*

Be it known that I, RUSSELL WILLIAM MUMFORD, a citizen of the United States, residing at New York, in the county of New York and State of New York, have invented certain new and useful Improvements in Decolorizing and Purifying Agents and Methods of Making the Same, of which the following is a specification.

This invention relates to decolorizing and purifying agents and methods of making the same; and it comprises as a new composition of matter a decolorizing and purifying agent consisting of granular vegetable carbon having open pores corresponding more or less closely to the original cellular material from which the carbon was made, such granular carbon having a rapid and high decolorizing power and having also the power of removing finely divided suspended solids from solutions; and it further comprises a method of making such material wherein a vegetable material, with or without the addition of colloid matter, in a wet state is mixed with an inorganic spacing material capable of slowly evolving gases and is slowly heated to a high temperature, the heat at first being such as will merely drive off the water and set the colloid matter and being then raised to a point where charring slowly takes place and the mineral matter will begin a slow evolution of gas, the temperature being finally raised to a high point; all as more fully hereinafter set forth and as claimed.

Many forms of purifying blacks or carbons are produced by charring of various vegetable and mineral products in different ways. For the most part they are produced as fine powders of little porosity in which substantially only the outer surface of each solid particle can be relied upon for the desired clarifying and purifying action. Even if containing a relatively large percentage of pure carbon, and if finely ground, as some of these purifying blacks are, they do not have the advantages possessed by boneblack because of its great porosity. They are particularly deficient as regards the power of removing suspended solids, mineral ash, etc., from the solutions or liquids to be purified. On the other hand they frequently themselves render the liquid more or less turbid with suspended fine particles of the purifying black itself.

The superiority of boneblack to vegetable carbon is not due to the greater clarifying and decolorizing power of the kind of carbon of which boneblack is composed, or to the percentage of pure carbon it contains, but is primarily due to its physical structure. As a matter of fact, when boneblack owing to numerous revivifications in kilns begins to show a greatly increased percentage of pure carbon, the sugar refineries usually discard it as having through the addition and deposition of such carbon, together with other impurities in its porous structure, lost its porousness, and therefore its decolorizing power.

The present invention relates to a carbon having a very rapid combined clarifying, purifying and decolorizing action of great efficiency, and to a new method of producing such carbon in large quantities and commercially feasible condition as to yield from the raw materials employed from any suitable material of vegetable origin. For instance, I may make it from sawdust, peat, lignite, vegetable residues of alcohol distillation, wood pulp, peat-moss, bark, corncobs, cellulose, or a wide variety of other products of vegetable origin. As a rule I find it better not to have the material too solid or compact in its structure, and prefer to use materials which are porous enough to have the power of absorbing water in a substantial amount. By the simple expedient of performing the charring or carbonization of the material under certain special well regulated conditions, I prevent any plugging up of the pores of the natural structure by oils, tarry matters or other impurities evolved in charring, and I furthermore clean out and treat the pores by a well regulated chemical action, mechanical action, or both, taking place therein during and after the process of carbonization. In ordinary charring to form ordinary charcoal the volatile products of destructive distillation (oils, tarry matters, etc.) accumulate in the pores where they are again in turn carbonized, forming what may be termed secondary carbon which tends to plug these pores. This result is desirable in making charcoal since it gives a denser heavier product, but it is not wanted here, my object being to make an open-pored material free, or substantially free, of secondary carbon.

In so doing I am enabled to obtain a carbon in which the pores remain substantially of the structure of those originally present in the raw material in its natural state; that is, the porosity of the carbon corresponds, as nearly as possible, to the cellular structure of the original material; the cells being and remaining thoroughly open as described above.

In the method of the present invention I usually first comminute the vegetable material, to obtain it in a finely divided form but I do not make it too fine, usually producing, say, a fineness corresponding to about a 12 to 16 mesh sieve (12 to 16 mesh per lineal inch). I then wash it, preferably in hot water, to remove all water-soluble impurities, and allow it afterward to soak up its natural proportion of pure water, performing this operation in such a manner that the mass does not become too pasty or too wet. It should not be so wet that water will run off.

In case the vegetable material is not of the proper character or texture so that it does not rapidly absorb a sufficient quantity of water in its cellular structure, I may let the material soak for some time in a 1 to 15 per cent solution of a hydrated colloid matter, which may be an organic substance such as gelatin, corn flour, potato flour, rice flour, starch, gluten and the like, which has the quality of absorbing and retaining water, or I may use a 1 to 15 per cent. solution or emulsion of a hydrated inorganic material, which gives its water off only at a relatively high temperature, such as clay or other hydrated colloidal silicates, oxids, or phosphates, such as the gelatinous tricalcium phosphate formed $in\ statu\ nascendi$ by mixing a solution of monocalcium phosphate with milk of lime, and the like, or in a solution or emulsion of a mixture of both organic and inorganic colloids, taking care that the vegetable material is well and uniformly impregnated with the hydrated colloid. It is my object to have a colloid body present, and if it be not naturally present, or not present in sufficient quantity I add it, choosing one which retains water, or is "hydrophilous", with some persistency. Organic or inorganic colloids may be used. Intimately incorporated gelatinous tricalcium phosphate, as mentioned above, is a very advantageous material to use, since not only it is colloidal in its nature, but it further operates to form an inorganic skeleton in the final material. I furthermore find it advantageous under certain conditions to boil the vegetable material for a short time after it has been impregnated with the colloid.

With the vegetable material prepared in the above described manner, my charring or carbonization process begins with the cellular structure full of water. As the mass becomes hot, steam is formed, and escapes, puffing up the mass from the interior as well as the individual particles, while at the same time it breaks open and clears out the structural cells. The steam also operates to remove volatile matters. With the mass initially moist to the right degree, the pores in charring to a large extent are cleared out before the organic matters begin to break up and carbonize. In addition the hydrated colloids which are of a plastic nature lose their water, and lose at the same time their plasticity or set, giving thus a skeleton structure or framework to the material throughout the entire mass even to its smallest particles. After drying and setting occur, charring takes place as the temperature slowly rises.

The moist vegetable material is advantageously heated under such circumstances that after the steaming and the charring proper have been practically completed, there will take place a further subsequent well regulated action, adapted to the purpose of cleaning out and probably widening the pores. For this purpose I advantageously use mineral matter slowly giving up gases under the influence of heat. This mineral matter plays a double part. In order to promote uniform heating of the character desired, and in order to have space for the escape of steam and vapors from the vegetable material, so that each particle of the vegetable material may be, as far as possible, individually subjected to the process, I generally mix the vegetable material prior to the charring, with finely granulated mineral matter, which will act as a "spacing agent" between the particles of vegetable matter. This mineral matter may, and usually does, act at the same time as an agent for furnishing the gases which I desire. The amount of such mineral I use is limited ordinarily from 5 to 50 per cent. of the mass, and I usually aim in any case to devalop the desired gases only after the first charring operation and the cleaning and puffing up of the vegetable material are practically finished. In spacing away the vegetable particles from each other by mineral matters in the manner described, the gases and vapors coming from one grain of vegetable material do not immediately enter another grain of vegetable material. As a mineral spacing agent I preferably use a mixture of mineral substances whose gas-evolving decomposition temperatures cover the whole range from the point that the structure of the vegetable material is fixed up through the various charring stages to the limit of temperature I attain. For this purpose I can advantageously use dolomite, or other magnesian limestones composed of varying proportions of magnesium carbonate and calcium carbonate. Magnesium carbonate begins to decompose at about 250° C. and its decomposition is finished at about 560° C., whereas calcium carbonate, the other component of dolomite, begins to decompose slightly above the temperature at which the magnesium carbonate is entirely decomposed, and finishes its decomposition at about 900° C. Both calcium carbonate and magnesium carbonate on calcining furnish gases which have the chemical or mechanical action, or both, here desired. The gas-evolving action takes place slowly at low temperatures, quickening as the temperature rises. In using an admixture of dolomite with the vegetable matter, it begins to furnish gas from the magnesium carbonate component at a comparatively low temperature, and as the temperature rises gas is evolved continuously in a slow and regular fashion and exercises its chemical and mechanical action or both in a continuous way.

Pure marble or limestone substantially free from magnesium carbonate does not give up gas to any extent until the temperature is at such a point that such gas exercises a rapid action on the carbonized vegetable material, while at lower temperatures no substantial amount of gas is evolved.

As to the exact nature of the action of the gas evolved from the dolomite upon the material, I can not say. The gas being mainly carbon dioxid, probably exercises a limited oxidizing influence, which tends to clear out and probably widen the pores. From the circumstances of the evolution the gas from each granule probably tends to enter the pores of the adjacent granules of vegetable matter, displacing the gases or vapors already there. The action may be a simple cleaning out; but, and very probably, it also affects the texture of the carbon on the pore walls. Whatever the nature of the action, it improves the quality of the final material.

I do not, however, restrict myself to the use of dolomite, and I may in practice use any other suitable material or materials slowly and progressively evolving gases or vapors capable of effecting the chemical or mechanical action or both as above described. Mixtures of various materials decomposing at different temperatures may also be employed for the same purpose. Mixture of various other carbonates than those occurring in the dolomite may be used. There are various oxids which are also adapted for the purposes, dissociating, with slow evolution of gas, at various temperatures. Manganese dioxid, $MnO_2$ on heating breaks down slowly into various stages of oxidation with an evolution of gas. Its use for the process described is advantageous since not only does it give a desirable type of limited oxidation in clearing the pores of the vegetable material, but it acts as a good spacing agent during the charring operation for spacing apart the vegetable particles. Manganese dioxid and other catalytically operating agents favor and speed the reaction and lead to the obtaining of a superior product. In the final product, after the charring has been completed, and the mineral matter separated as far as may be, a little manganese is ordinarily still present, and gives to the carbon a measure of catalytic function, which is useful in many kinds of clarifications and decolorizations. Mixtures of different oxids and carbonates decomposing at various temperatures may also be used. As already stated, various phosphates, such as tricalcium phosphate, alone or in mixtures, may also be used; and these phosphates may be employed as spacing powders.

In the present invention after treating the vegetable material with carefully chosen percentages of the hydrated organic or inorganic colloid, and after boiling the mass, I mix with various percentages, (usually ranging from 5 per cent. to 50 per cent.) of the mineral spacing agent of a type, giving as stated above, a gradual evolution of gases for the purpose described.

By increasing the percentage of the hydrated colloid, I can decrease the percentage of the mineral spacing agent in certain proportions producing by such methods final products or carbons of various grades and structure, and in some cases, I may even reduce the percentage of mineral spacing agent used below the 5 per cent. above mentioned.

On the other hand, I may decrease the percentage of the hydrated colloidal agent, in certain cases even below the 1 per cent. mentioned previously, and increase in certain proportions the amount of mineral spacing agent used, producing by such methods final products or carbons of various grades and structures.

The invention will be further illustrated by the following more detailed description of a specific embodiment or embodiments thereof. Any suitable vegetable matter such as ordinary sawdust, (preferably pine), a residue of alcohol distillation, wood pulp, lignite, peat, peat moss, bark, cornstalks, corncobs, cellulose, etc. etc. is comminuted to a powder of, say, between 10 to 16 mesh. The material is best preliminarily washed in hot water to get rid, as far as possible, of all water-soluble matter. I then treat the material with as much of a solution or milk of from 1 to 15 per cent. of potato flour or starch, or of 1 to 15 per cent. of gelatinous tricalcium phosphate, made from monocalcium phosphate and milk of lime, or of a mixture of both, as it will hold, without becoming too wet a paste or allowing water to run off. For example the material may advantageously be boiled for a short time with an aqueous mixture containing ten per cent. of potato flour or corn flour until a uniform paste is formed. I then add from 5 to 50 per cent. of the mineral spacing agent, for instance dolomite in an 80 to 100 mesh size (80 to 100 mesh per lineal inch) and mix to uniformity under constant stirring, or by use of a mechanical mixer. The mass is then gradually and progressively heated in a retort, which should be vented to allow escape of water vapors and gases and to which a slow rotary motion can be given. For a time the presence of the water keeps the temperature in the mass not over 100° C. With the expulsion of water vapor many volatile bodies whose presence tends to clog the cellular structure of the vegetable matter are expelled, and the action of water vapor in removing these volatile bodies is very advantageous. Besides this, as stated, the steam has a tendency to puff up and break open the cellular structure of the material and render it more porous. As the water is removed the hydrated colloid loses its plasticity and attains a permanent rigid structure or sets. The mass becomes dry and charring then takes place. This charring does not require much heat, and the temperature would tend to rise rapidly in this stage, but for the presence of the mineral powder or spacing agent, which when used acts as an inert diluent in addition to its spacing function. As the vegetable particles char vapors are evolved, and these pass out of the pores. As the temperature slowly and progressively rises, the described vapors and gases formed in charring are expelled and leave the zone of reaction. After the main part of the charring of the vegetable matter is about complete, the temperature rises to the point, say about 250° C., at which the mineral agent begins to evolve gases, which are absorbed, or taken up in the open pores of the adjacent particles of charred vegetable material. As the temperature keeps on rising, after a time these absorbed matters begin to act upon the lining carbon of the pores, and such carbon as may have been formed or deposited therein in the charring. The calcination of the mineral absorbs heat and, under the conditions stated the rise in temperature is, so to speak, retarded; so that the temperature does not tend to rise rapidly to a point at which the action would be too energetic. For a time the action is principally evolution of gases by the mineral spacing agent and action of the gases on the char. I ultimately carry the temperature up to 800° or 900° C. and then dump the material into water under the exclusion of air.

Instead of using one mineral such as the dolomite above mentioned I can use two or more materials, a mixture of for instance from 5 to 50 per cent. of magnesium carbonate with phosphate rock containing a large percentage of tricalcium phosphate, but the process remains otherwise the same.

By adding a small percentage of manganese dioxid ($MnO_2$) either to the dolomite or to the mixture of materials such as magnesium carbonate and phosphate rock, it acts as a catalytic agent in speeding up the reaction. A little manganese remaining in the finished product gives it, as stated, a catalytic function desirable in many purifications, clarifications and decolorizations; otherwise the process remains the same.

After dumping the material in water under the exclusion of air, it is next freed as much as desirable from mineral matters either by sedimentation or centrifuging, or by a treatment with a suitable acid. I preferably remove all or substantially all of the mineral spacing agents. It is particularly desirable to remove lime and magnesia and especially where my final product is to be used in the refining of sugar solutions, and particularly when previously clarified "thick juices" are to be treated. The carbon is then dried, and, if desired, ground to any size required. It is not possible to secure advantageous results under this process by replacing the self-evolved gases of the mixture above described by a flowing current of products of combustion, or steam, for the reason that in such a case there is too much oxidant present and the action is not the local one of pore opening which I desire. The retort being vented any excess of gases and vapors produced can and does escape, but the atmosphere within the retort is comparatively quiescent. As stated, in developing the gases from the mineral spacing matter they are to some extent taken up or absorbed in the pores of the char and exercise their action there. In heating in a flowing current of gases or steam, the action takes place more on the exterior of the grain or granule than in its interior and too vehement action takes place, destroying too much of the carbon itself. For the same reason I do not use materials which would give a sudden evolution of large volumes of gases at a high temperature. Too rapid a chemical reaction at high temperatures tends to destroy very quickly the fibrous structure of the carbon and the carbon itself.

My new article of manufacture may be described as a quick and clear filtering, rapidly acting, purifying, clarifying and decolorizing carbon having a relatively enormous "adsorption" power, owing to its porous structure and large surface area, due to the fact that the pores are kept open during the carbonization. Production of these characters are favored by the mineral spacing agent, the reinforcing colloid, which forms a rigid structure on dehydration and by the evolution of gases capable of affecting the pores. When an organic colloid, such as starch or cornflour, etc., is used, not only is the material reinforced and its structure thereby maintained, but added carbon is formed from the organic colloid itself which further improves the product. The product is one distinguished from any ordinary vegetable charcoal in that it retains substantially the shape and size and open porous structure of the material from which it is produced.

The structure of my product is comparable with that of bone charcoal, which owes its characteristic qualities primarily to its open porous structure. Being of this nature my product may be used in relatively coarse powder, although it can also be ground to any fineness desired. In comminution it is desirable not to use impact or any hammering action by which the porous structure might be destroyed.

The two principal advantages of my new decolorizing carbon as compared with boneblack which is universally used in sugar refining are:

(*a*) its very much greater purifying and decolorizing efficiency; and (*b*) its very much greater speed of action, which is measured by minutes instead of by hours as is the case with boneblack.

It is to be understood that by my process I can also make powders of any desired degree of fineness, and I can do this by first producing a coarse carbon in the manner described and then comminuting or disintegrating it by any process that does not subject it to a pounding or impact action, or by suitably regulating the composition of the materials charred, that is to say, I have found that certain of the mixtures I may use, produce carbons of an original very high degree of fineness, without any necessity for subsequent grinding, while on the other hand, certain other mixtures result in very coarse-grained carbons which are especially suitable for certain purposes.

My preparation, consisting as it usually does of more or less coarse open textured grains, superadds another physical function in purifying which is analogous to that of kieselguhr and boneblack, to wit, it tends to pick up and hold the very fine floating and suspended matter in liquids (much of which is ultra-microscopic in its fineness) in its pores. In other words, it combines the functions of boneblack and of kieselguhr in the purifying, clarifying and decolorizing of all kinds of liquids.

The action of this new product is as above stated very rapid and is entirely one of "adsorption" so far as relates to the removal of matters in solution, no bleaching or chemical reaction taking place when used with any solution or liquid to be clarified, purified or decolorized. There is no danger of after coloring occurring in the products treated as is the case when acids or other bleaching agents having a chemical action are used for the purpose of decolorization.

The coloring matter as well as most of the other impurities which have been "adsorbed" by my new material, while in contact with solutions purified or decolorized thereby, can be easily extracted by washing with hot water and with a 5 to 10 per cent. solution of caustic soda, followed by washing with hot water and with a solution of 2 to 3 per cent. hydrochloric acid or by washing with hydrochloric acid alone. The product is then ready to be used over again. No heating of the product in retorts is necessary for the regeneration, although this can be done if desired.

What I claim is:—

1. The process of producing, on a commercial scale, a carbon for decoloizing, clarifying and purifying, which comprises slowly and gradually heating an intimate mixture of moist vegetable material, a colloid material and a granular mineral spacing agent, through a range of temperatures adapted first to dry the material and then to slowly char it and finally ending above 600° C.

2. The process of producing on a commercial scale, a carbon for decoloizing, clarifying and purifying, which comprises slowly and progressively heating an intimate mixture of moist vegetable material, colloid material and a mineral spacing agent through a range of temperatures adapted first to dry the materials and then to slowly char them until such materials are completely charred, the mineral agent being one evolving gases throughout the charring range.

3. The process of producing on a commercial scale a carbon for decolorizing, clarifying and purifying, which comprises slowly and progressively heating an intimate mixture of moist vegetable material, colloid material and a mineral spacing agent through a range of temperatures adapted first to dry the material and then to slowly char it and finally ending above 600° C., and mineral agent being one capable of evolving gases throughout the charring range and above.

4. The process of producing on a commercial scale a carbon for decolorizing, clarifying and purifying, which comprises slowly and gradually heating an intimate mixture of moist vegetable material and colloid matter through a range of temperatures adapted first to dry the material and then to slowly char it and finally ending at a temperature above 600° C. under conditions precluding a rapid rise in temperature at any time.

5. The process of producing on a commercial scale a carbon for decolorizing, clarifying and purifying, which comprises slowly and gradually heating an intimate mixture of moist vegetable material with a watery mixture carrying 1 to 15 per cent. of a vegetable flour through a range of temperatures adapted first to dry the material and then to slowly char it and finally ending at a temperature above 600° C.

6. The process of producing on a commercial scale a carbon for decolorizing, clarifying and purifying, which comprises slowly and gradually heating through a range of temperatures adapted first to dry the material and then to slowly char it and finally ending at a temperature above 600° C., an intimate mixture of a moist vegetable material with a hydrated plastic material losing it plasticity at a temperature below the temperature at which carbonization of the vegetable material is completed.

7. The process of producing on a commercial scale a carbon for decolorizing, clarifying and purifying, which comprises slowly and gradually heating through a range of temperatures adapted first to dry the material and then to slowly char it and finally ending at a temperature above 600° C., an intimate mixture of a moist vegetable material with a colloid material which acquires a rigid structure at a temperature below the temperature at which carbonization of the vegetable material is completed.

8. The process of producing on a commercial csale, carbon for decolorizing, clarifying and purifying, which comprises slowly and gradually heating through a range of temperatures adapted first to dry the material and then to slowly char it and finally ending at a temperature above 600° C., an intimate mixture of a hydrated vegetable material with a gelatinous material which acquires a rigid structure at a temperature below the temperature at which carbonization of the vegetable material is completed.

9. The process of producing on a commercial scale carbon for decolorizing, clarifying and purifying, which comprises slowly and gradually heating vegetable materials in the presence of a catalytic agent capable of favoring the charring action through a range of temperatures adapted first to dry the material and then to slowly char it and finally ending at temperatures above 600° C.

10. The process for producing carbon for decolorizing, clarifying, and purifying, which comprises slowly and gradually heating a mixture of moist vegetable and mineral materials in the presence of a catalytic agent capable of favoring the production of vapors and gases during the charring action through a range of temperatures adapted first to dry the material and then to slowly char it and finally ending at a temperature above 600° C.

11. The process of producing carbon for decolorizing, clarifying, and purifying, which comprises slowly and gradually heating a mixture of moist vegetable material with a colloid material and mineral materials in the presence of a catalytic agent capable of favoring the charring action through a range of temperatures adapted first to dry the material and then to slowly char it and finally ending at a temperature above 600° C.

12. The process of producing carbon for decolorizing, clarifying, and purifying, which comprises slowly and gradually drying and carbonizing at a low temperature an intimate mixture of a moist vegetable material and a colloid and then subjecting it to the action of limited amounts of a gaseous agent at temperatures extending through the entire charring range and finally rising above 600° C.

13. In the production of a decolorizing carbon, the process which comprises making a mixture of a moist comminuted vegetable matter containing colloid substances with a mineral powder capable of gradually evolving gases at various temperatures, such evolution beginning at a temperature at which carbonization of the vegetable matter has begun, and gradually heating the mixture in a closed receptacle until the water is expelled, the vegetable material is carbonized and the evolution of gas from the mineral matter has cleaned out the pores, the heating being through a range of temperatures adapted first to dry the material and then slowly char it and finally give a complete charring.

14. In a production of a decolorizing carbon, the process which comprises making a mixture of a moist comminuted vegetable matter and colloid substances with a mineral powder capable of evolving gases over a wide range of decomposition temperatures, such evolution beginning at a temperature at which carbonization of the vegetable matter has begun, and gradually heating the mixture in a closed receptacle until the water is expelled, the vegetable material is carbonized and the evolution of gas from the mineral matter has cleaned out the pores, the heating being through a range of temperatures adapted first to dry the material and then slowly char it and finally give a complete charring.

15. In the production of a decolorizing carbon, the process which comprises making an intimate mixture of comminuted moist vegetable matter and powdered dolomite, heating to a temperature at which the moisture is driven off, continuing the heating and raising the temperature until charring takes place, and continuing the heating and increasing the temperature until the dolomite evolves gases and cleans out the pores, cooling the heated material under exclusion of air and removing the mineral matter.

16. In the production of a decolorizing carbon, the process which comprises making an intimate mixture of comminuted moist vegetable matter containing colloid substances with powdered dolomite, heating until charring takes place, and continuing the heating and increasing the temperature while the dolomite evolves gases and cleans out the pores, cooling the material under exclusion of air and removing the mineral matter.

17. In the production of a decolorizing carbon, the process which comprises making a mixture of granular moist vegetable matter containing colloid substances with granular dolomite and manganese dioxid, heating the mixture to drive off the water as steam, continuing the heating to char the vegetable material, continuing the heating to cause an evolution of gases from the mineral matter to clean out the pores, cooling under exclusion of air and removing the mineral matter.

18. In the production of a decolorizing carbon, the process which comprises making a mixture of granular moist vegetable matter with granular dolomite and manganese dioxid, heating the mixture to drive off the water as steam, continuing the heating to char the vegetable material, continuing the heating to cause an evolution of gases from the mineral matter to clean out the pores, cooling under exclusion of air and removing the mineral matter.

19. In the production of a decolorizing carbon, the process which comprises making an intimate mixture of comminuted vegetable material containing colloid substances with granular phosphate rock and manganese dioxid, heating the mixture to drive off the water as steam, continuing the heating to cause an evolution of gases from the mineral matter to clean out the pores, cooling under exclusion of air and removing the mineral matter.

20. The process of producing on a commercial scale a carbon for decolorizing clarifying and purifying which comprises slowly and gradually heating an intimate mixture of vegetable material with a watery mixture carrying 1 per cent. to 15 per cent. of starch through a range of temperatures adapted first to dry the material and then to slowly char it and finally ending above 600° C.

21. The process of producing on a commercial scale a carbon for decolorizing, clarfying and purifying which comprises slowly and gradually heating an intimate mixture of moist vegetable matter comprising residues of alcohol making, a colloid material and a granular mineral spacing agent through a range of temperatures adapted first to dry the material and then to slowly char it and finally extending above 600° C.

22. As a new article of manufacture, a vegetable carbon of very rapid and efficient purifying and decolorizing power having unclogged pores and representing approximately the original texture of the vegetable material from which the char was made, such pores being substantially free of secondary carbon and substantially unchanged in dimensions.

23. As a new article of manufacture, a coarse grained vegetable carbon of very rapid and efficient purifying and decolorizing power having unclogged pores representing approximately the original texture of the vegetable material from which the char was made, such vegetable carbon being impregnated with a small amount of a manganese compound.

24. As a new article of manufacture, a coarse grained quick and clear filtering vegetable carbon of very rapid and efficient decolorizing power having unclogged pores and representing approximately the original texture of the vegetable material from which the char was made, such pores being substantially free of secondary carbon and substantially unchanged in dimensions.

25. As a new article of manufacture, a fine grained quick and clear filtering vegetable carbon of very rapid and efficient decolorizing power having unclogged pores and representing approximately the original texture of the vegetable material from which the char was made, such pores being substantially free of secondary carbon and substantially unchanged in dimensions.

In testimony whereof, I affix my signature.

RUSSELL WILLIAM MUMFORD.